(12) United States Patent
Enomoto (10) Patent No.: US 7,227,695 B2
(45) Date of Patent: Jun. 5, 2007

(54) ZOOM LENS SYSTEM (75) Inventor: Takashi Enomoto, Chiba (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/390,172

(22) Filed: Mar. 28, 2006

(65) Prior Publication Data

US 2006/0221463 A1 Oct. 5, 2006

(30) Foreign Application Priority Data

Mar. 29, 2005 (JP) ............................. 2005-095327

(51) Int. Cl.
G02B 15/14 (2006.01)
(52) U.S. Cl. ..................................... 359/680; 359/689
(58) Field of Classification Search ........ 359/680–683, 359/689, 713
See application file for complete search history.

(56) References Cited

U.S. PATENT DOCUMENTS

| 6,417,973 | B2 | 7/2002 | Mihara et al. | 359/680 |
| 6,498,687 | B1 | 12/2002 | Sekita et al. | 359/691 |
| 6,538,824 | B1 | 3/2003 | Mihara et al. | 359/682 |
| 6,545,819 | B1 | 4/2003 | Nanba et al. | 359/689 |
| 6,757,111 | B2 | 6/2004 | Takeuchi et al. | 359/784 |
| 6,822,808 | B2 | 11/2004 | Nanba et al. | 359/689 |
| 6,862,143 | B2 | 3/2005 | Hoshi et al. | 359/689 |
| 6,999,242 | B2 | 2/2006 | Nanba et al. | 359/689 |
| 2004/0076416 | A1 | 4/2004 | Mihara | 369/72 |
| 2005/0024749 | A1 | 2/2005 | Nanba et al. | 359/784 |
| 2005/0041303 | A1 | 2/2005 | Nanba et al. | 359/680 |
| 2006/0056045 | A1* | 3/2006 | Yoshitsugu | 359/680 |

FOREIGN PATENT DOCUMENTS

| JP | 2002-14284 | 1/2002 |
| JP | 2003-121743 | 4/2003 |
| JP | 2003-140043 | 5/2003 |
| JP | 2003-140046 | 5/2003 |
| JP | 2003-140047 | 5/2003 |

OTHER PUBLICATIONS

English Language Abstract of JP 2003-121743.
English Language Abstract of JP 2003-140047.

* cited by examiner

Primary Examiner—Scott J. Sugarman
Assistant Examiner—M. Hasan
(74) Attorney, Agent, or Firm—Greenblum & Bernstein, P.L.C.

(57) ABSTRACT

A zoom lens system includes a negative first lens group, a diaphragm, a positive second lens group, and a positive third lens group, in this order from the object. Zooming is performed by moving the negative first lens group and the positive first lens group in the optical axis direction. The zoom lens system includes six lens elements divided into lens group as follows: a negative first lens element and a positive second lens element, in this order from the object, constitute the negative first lens group; a positive third lens element, a negative fourth lens element and a positive fifth lens element, all of which are bonded to each other, in this order from the object, constitute the positive second lens group; and a positive sixth lens element constitutes the positive third lens group.

15 Claims, 7 Drawing Sheets

SPHERICAL ABERRATION
CHROMATIC ABERRATION

Fig. 2B 
W=35.4°

LATERAL CHROMATIC ABERRATION

Fig. 2C 
W=35.4°

ASTIGMATISM

Fig. 2D 
W=35.4°

DISTORTION

Fig. 3A
F=1:4.6

—— d Line
······ g Line
---- C Line

-0.2   0.2
SPHERICAL
ABERRATION
CHROMATIC
ABERRATION

Fig. 3B
W=20.7°

-0.02   0.02
LATERAL
CHROMATIC
ABERRATION

-0.2   0.2
ASTIGMATISM

Fig. 3D
W=20.7°

-10.0(%)10.0
DISTORTION

Fig. 4A
F=1:6.3

—— d Line
······ g Line
---- C Line

-0.2   0.2
SPHERICAL
ABERRATION
CHROMATIC
ABERRATION

Fig. 4B
W=12.4°

-0.02   0.02
LATERAL
CHROMATIC
ABERRATION

-0.2   0.2
ASTIGMATISM

Fig. 4D
W=12.4°

-10.0(%)10.0
DISTORTION

— d Line
······ g Line
---- C Line

SPHERICAL ABERRATION

CHROMATIC ABERRATION

Fig. 6B
W=35.3°

LATERAL CHROMATIC ABERRATION

ASTIGMATISM

Fig. 6D
W=35.3°

DISTORTION

Fig. 7A
F=1:4.6

—— d Line
------- g Line
- - - - C Line

-0.2  0.2
SPHERICAL
ABERRATION

CHROMATIC
ABERRATION

Fig. 7B
W=20.9°

-0.02  0.02
LATERAL
CHROMATIC
ABERRATION

-0.2  0.2
ASTIGMATISM

Fig. 7D
W=20.9°

-10.0(%)10.0
DISTORTION

Fig. 8A
F=1:6.3

—— d Line
------- g Line
- - - - C Line

-0.2  0.2
SPHERICAL
ABERRATION

CHROMATIC
ABERRATION

Fig. 8B
W=12.6°

-0.02  0.02
LATERAL
CHROMATIC
ABERRATION

-0.2  0.2
ASTIGMATISM

Fig. 8D
W=12.6°

-10.0(%)10.0
DISTORTION

-0.2  0.2
SPHERICAL
ABERRATION
CHROMATIC
ABERRATION

— d Line
······ g Line
---- C Line

Fig. 10B
W=35.2°

-0.02  0.02
LATERAL
CHROMATIC
ABERRATION

Fig. 10C
W=35.2°

-0.2  0.2
ASTIGMATISM

-10.0(%)10.0
DISTORTION

Fig. 11A
F=1:4.6

-0.2  0.2
SPHERICAL
ABERRATION
CHROMATIC
ABERRATION

Fig. 11B
W=20.5°

-0.02  0.02
LATERAL
CHROMATIC
ABERRATION

Fig. 11C
W=20.5°

-0.2  0.2
ASTIGMATISM

Fig. 11D
W=20.5°

-10.0(%)10.0
DISTORTION

Fig. 12A
F=1:6.3

-0.2  0.2
SPHERICAL
ABERRATION
CHROMATIC
ABERRATION

Fig. 12B
W=12.3°

-0.02  0.02
LATERAL
CHROMATIC
ABERRATION

Fig. 12C
W=12.3°

-0.2  0.2
ASTIGMATISM

Fig. 12D
W=12.3°

-10.0(%)10.0
DISTORTION

Fig.13

ZOOM LENS SYSTEM

BACKGROUND OF THE INVENTION

1. Field of the Invention

The present invention relates to a zoom lens system, and, in particular, relates to an ultra-compact zoom lens system suitable for a digital camera.

2. Description of the Prior Art

In recent years, cellular phones with camera-function and PDAs (Personal Digital Assistant) have rapidly become popular. Accordingly, further miniaturization of a digital camera containing an imaging device therein and higher image quality are in demand. In order to provide higher image quality, an imaging device is required to attain an image size of approximately ⅓ inch (diagonal image height=3.0 mm) or larger.

Likewise, a zoom lens system which is designed for higher pixelation has naturally been required to be further miniaturized and to attain higher image quality. However, in conventional zoom lens systems which are mainly utilized in cellular phones with camera-function, the number of lens elements of a zoom lens system is about three or four, which is not sufficient to attain higher image quality. On the other hand, a zoom lens system which has commonly been used in a digital camera includes six to eight lens elements; and it is understood that such a number of lens elements (six to eight) cannot attain sufficient miniaturization of the zoom lens system.

As a miniaturized zoom lens system, a negative-lead type zoom lens system in which a lens group having a negative refracting power is positioned at the most object-side therein has generally been employed. In this regard, the following two types of the negative-lead type zoom lens system have been well known:

(i) a negative-lead type zoom lens systems of a two-lens-group arrangement, i.e., a first lens group having a negative refractive power (hereinafter, a negative first lens group), and a second lens group having a positive refractive power (hereinafter, a positive second lens group), in this order from the object; and (ii) a negative-lead type zoom lens systems of a three-lens-group arrangement, i.e., a negative first lens group, a positive second lens group and a third lens group having a positive refractive power (hereinafter, a positive third lens group), in this order from the object.

In the negative-lead type zoom lens system of the two-lens-group arrangement, an attempt has generally been made to achieve further miniaturization of the zoom lens systems by increasing the number of lens elements in the positive second lens group. Due to this arrangement, the magnification increases and the traveling distance of the positive second lens group becomes shorter.

In the negative-lead type zoom lens system of the three-lens-group arrangement, the number of lens groups increases, and so does lens elements. Consequently, the traveling distance of each lens group can be made shorter; however, for the purpose of attaining further miniaturization of the zoom lens system, it becomes difficult to determine a balance among the increase in the number of both lens groups and lens elements, the overall length of the zoom lens system, and the increase in the diameter of the lens groups.

The present invention is materialized in a zoom lens system of the three-lens-group arrangement, i.e., a negative first lens group, a positive second lens group, and a positive third lens group, in this order from the object. Namely, the present invention is to provide an ultra-compact zoom lens system of the three-lens-group arrangement, which is constituted by a fewer number of lens elements, and can meet higher pixelation of an imaging device.

SUMMARY OF THE INVENTION

According to an aspect of the present invention, there is provided a zoom lens system including a negative first lens group, a diaphragm, a positive second lens group, and a positive third lens group, in this order from the object.

Zooming is performed by moving the negative first lens group and the positive second lens group in the optical axis direction.

Specifically, the zoom lens system includes six lens elements; and the six lens elements are divided into the lens groups as follows:

a negative first lens element and a positive second lens element, in this order from the object, are arranged to constitute the negative first lens group;

a positive third lens element, a negative fourth lens element and a positive fifth lens element, all of which are bonded to each other, in this order from the object, are arranged to constitute the positive second lens group; and a positive sixth lens element is arranged to constitute the positive third lens group.

According to the zoom lens system of the present invention, upon zooming from the short focal length extremity to the long focal length extremity, the distance between the negative first lens group and the positive second lens group decreases; and the distance between the positive second lens group and the positive third lens group increases, while the positive third lens group remains stationary with respect to the image plane.

The zoom lens system preferably satisfies the following condition:

$$1.2 < f_{2G}/f_W < 1.6 \qquad (1)$$

wherein $f_{2G}$ designates the focal length of the positive second lens group; and $f_W$ designates the focal length of the entire zoom lens system at the short focal length extremity.

The zoom lens system preferably satisfies the following condition:

$$0.8 < f_W/f_3 < 1.2 \qquad (2)$$

wherein $f_W$ designates the focal length of the entire zoom lens system at the short focal length extremity; and $f_3$ designates the focal length of the positive third lens element of the positive second lens group.

The zoom lens system preferably satisfies the following condition:

$$-2.0 < f_W/f_4 < -1.4 \qquad (3)$$

wherein $f_W$ designates the focal length of the entire zoom lens system at the short focal length extremity; and $f_4$ designates the focal length of the negative fourth lens element of the positive second lens group.

The zoom lens system preferably satisfies the following condition:

$$0.8 < f_W/f_5 < 1.4 \qquad (4)$$

wherein $f_W$ designates the focal length of the entire zoom lens system at the short focal length extremity; and $f_5$ designates the focal length of the positive fifth lens element of the positive second lens group.

The zoom lens system preferably satisfies the following condition:

$$1.5 < |f_{1G}|/f_W < 2.5 \qquad (5)$$

wherein $f_{1G}$ designates the focal length of the negative first lens group; and $f_W$ designates the focal length of the entire zoom lens system at the short focal length extremity.

The zoom lens system preferably satisfies the following condition:

$$0.2 < f_{2G}/f_6 < 0.5 \qquad (6)$$

wherein $f_{2G}$ designates the focal length of the positive second lens group; and $f_6$ designates the focal length of the positive sixth lens element (the positive third lens group).

The zoom lens system preferably satisfies the following condition:

$$0.5 < \Sigma 2G/f_W < 1.0 \qquad (7)$$

wherein $\Sigma 2G$ designates the distance from the most object-side surface of the positive second lens group to the most image-side surface thereof; and $f_W$ designates the focal length of the entire zoom lens system at the short focal length extremity.

The zoom lens system preferably satisfies the following condition:

$$(Nn-Np)/r_{C2} < 0.1 \qquad (8)$$

wherein

Nn designates the refractive index of the d-line with respect to the negative fourth lens element of the positive second lens group;

Np designates the refractive index of the d-line with respect to the positive fifth lens element of the positive second lens group; and $r_{C2}$ designates the radius of curvature of the bonding surface between the negative fourth lens element and the positive fifth lens element of the positive second lens group.

The zoom lens system preferably satisfies the following condition:

$$12 < \nu p - \nu n \qquad (9)$$

wherein

νp designates the average Abbe number with respect to the positive third lens element and the positive fifth lens element of the positive second lens group; and νn designates the Abbe number of the negative fourth lens element of the positive second lens group.

The zoom lens system preferably satisfies the following condition:

$$10° < \beta W < 25° \qquad (10)$$

wherein

βW designates an angle formed by the optical axis and a principal ray with respect to the maximum image height at the short focal length extremity.

The zoom lens system preferably satisfies the following condition:

$$\beta W - \beta T < 12° \qquad (11)$$

wherein

βW designates an angle formed by the optical axis and a principal ray with respect to the maximum image height at the short focal length extremity; and βT designates an angle formed by the optical axis and a principal ray with respect to the maximum image height at the long focal length extremity.

The zoom lens system preferably satisfies the following condition:

$$0 < r_{C1} \qquad (12)$$

wherein $r_{C1}$ designates the radius of curvature of the bonding surface between the positive third lens element and the negative fourth lens element of the positive second lens group.

The zoom lens system preferably satisfies the following condition:

$$2.8 < f_T/f_W \qquad (13)$$

wherein $f_T$ designates the focal length of the entire zoom lens system at the long focal length extremity; and $f_W$ designates the focal length of the entire zoom lens system at the short focal length extremity.

It is possible for the zoom lens system of the present invention to perform focusing by one of the following moving patterns of the lens groups:

(i) moving the negative first lens group only;

(ii) moving the positive second lens group only; or (iii) integrally moving the negative first lens group and the positive second lens group.

The present disclosure relates to subject matter contained in Japanese Patent Application No. 2005-95327 (filed on Mar. 29, 2005) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 13:
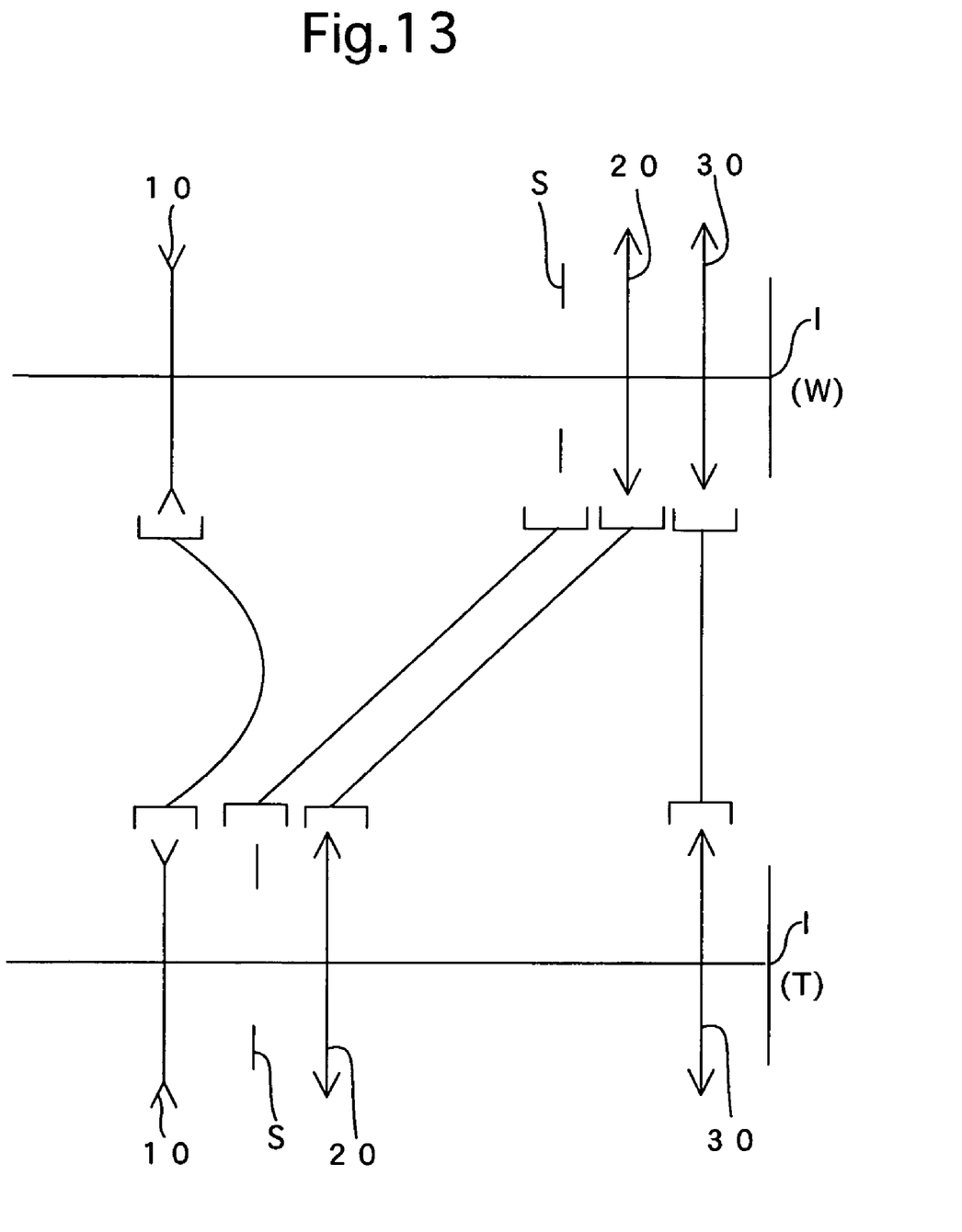
FIG. 13 is the schematic view of the lens-group moving paths for the zoom lens system according to the present invention.

The zoom lens system of the present invention includes, as shown in the lens-group moving paths of FIG. 13, a negative first lens group 10, a diaphragm S, a positive second lens group 20, and a positive third lens group 30, in this order from the object.

The negative first lens group 10 includes a negative first lens element and a positive second lens element, in this order from the object.

The positive second lens group 20 includes appositive third lens element, a negative fourth lens element and a positive fifth lens element (i.e., the triplet type lens arrangement), all of which are bonded to each other, in this order from the object.

The positive third lens group 30 includes a positive sixth lens element.

Upon zooming from the short focal length extremity (W) to the long focal length extremity (T), the negative first lens group 10 first moves toward the image and thereafter moves toward the object; the positive second lens group 20 moves monotonically toward the object; and the positive third lens group 30 remains stationary (i.e., does not move relative to an image plane I).

Due to the above movement of the lens groups upon zooming, the distance between the negative first lens group 10 and the positive second lens group 20 largely decreases at first and thereafter decreases gradually; the distance between the positive second lens group 20 and the positive third lens group 30 increases monotonically; and the diaphragm S moves together with the positive second lens group 20.

It is possible for the zoom lens system to perform focusing by one of the following moving patterns of the lens groups:

(i) moving the negative first lens group 10 only;

(ii) moving the positive second lens group 20 only; or (iii) integrally moving the negative first lens group 10 and the positive second lens group 20.

The negative first lens group 10 is constituted by two lens elements (the negative first lens element and the positive second lens element) so as to achieve miniaturization. In order to correct distortion in particular, it is desirable to utilize an aspherical surface. It has been known to constitute the negative first lens group with three lens elements; however, the three lens elements causes an increase in the thickness of the negative first lens group, so that miniaturization thereof becomes difficult.

In regard to the triplet-type positive second lens group 20, all the three lens elements are bonded to each other for the purpose of miniaturization.

As explained, the entire second lens group 20 has a positive refractive power, and includes three lens elements; and it is common practice to constitute the positive second lens group by two positive lens elements and one negative lens element.

In the case where the correcting of spherical aberration is considered, the positive second lens group including two lens elements both of which have strong positive power and a negative lens element, in this order from the object, has often been employed. However, since the convex surfaces of the positive lens elements have to contact with each other, bonding the three lens elements becomes difficult.

On the other hand, in the case where the positive lens element, the negative lens element and the positive lens element are arranged in this order from the object, this arrangement is suitable for the correcting of aberrations; however, it should be understood that sensitivity of decentration with respect to the positive lens elements and the negative lens element becomes noticeable. In order to avoid such a drawback, by bonding all the three lens elements, (i) miniaturization of the positive second lens group 20 can be attained, (ii) aberrations occurred therein can suitably be corrected, and (iii) the sensitivity on decentration of each lens element can be improved.

Namely, even if the decentration sensitivity of each lens element and the distance sensitivity between lens elements are set to be higher, deterioration of optical performance due to manufacturing error can be made minimal, and the thickness of the positive second lens group, i.e., the distance from the most object-side to the most image-side thereof, can be reduced.

Furthermore, by providing the positive third lens group 30 behind (on the image side of) the positive second lens group 20, sufficient magnification and telecentricity can be achieved. In the present invention, by constituting the positive third lens group 30 by a single lens element (the positive sixth lens element), miniaturization of the positive third lens group 30 can be attained.

Condition (1) concerns the focal length of the positive second lens group 20.

If the refractive power of the positive second lens group 20 becomes weaker to the extent that $f_{2G}/f_W$ exceeds the upper limit of condition (1), the traveling distance of the positive second lens group 20 becomes longer from the short focal length extremity to the long focal length extremity increases. When $f_{2G}/f_W$ exceeds the upper limit of condition (1), if an attempt is made to miniaturize the zoom lens system, the refractive power of the negative first lens group 10 has to be set stronger, and aberrations, particularly, coma at the short focal length extremity, largely occur. Consequently, the correcting of aberrations by the positive second lens group 20 and the positive third lens group 30 becomes difficult.

If the refractive power of the positive second lens group 20 becomes stronger to the extent that $f_{2G}/f_W$ exceeds the lower limit of condition (1), the traveling distance of the positive second lens group 20 becomes shorter, so that the entire zoom lens system can be miniaturized. However, aberrations, particularly, spherical aberration, largely occur. Consequently, the correcting of aberrations by the negative first lens group 10 (the two lens elements) and the positive third lens group 30 (a single lens element) becomes difficult.

Condition (2) concerns the focal length of the positive third lens element of the positive second lens group 20.

If the refractive power of the positive third lens element becomes stronger to the extent that $f_W/f_3$ exceeds the upper limit of condition (2), the refractive power of the positive second lens group 20 can be made stronger; however, spherical aberration occurred only in the positive third lens element becomes larger, so that the correcting of such spherical aberration becomes difficult.

If the refractive power of the positive third lens element becomes weaker to the extent that $f_W/f_3$ exceeds the lower limit of condition (2), the positive refractive power in the positive second lens group 20 cannot be made stronger. When $f_W/f_3$ exceeds the lower limit of condition (2), if an attempt is made to miniaturize the overall length of the zoom lens system, most of the positive refractive power of the positive second lens group 20 has to be loaded on the positive fifth lens element thereof. Consequently, spherical aberration occurred in the positive fifth lens element becomes larger, so that the correcting thereof becomes difficult.

Condition (3) concerns the focal length of the negative fourth lens element of the positive second lens group 20.

If the refractive power of the negative fourth lens element becomes weaker to the extent that $f_W/f_4$ exceeds the upper limit of condition (3), spherical aberration occurred in the positive second lens group 20 is undercorrected, and the correcting thereof becomes difficult.

If the refractive power of the negative fourth lens element becomes stronger to the extent that $f_W/f_4$ exceeds the lower limit of condition (3), the negative refractive power in the positive second lens group 20 becomes too strong. When $f_W/f_4$ exceeds the lower limit of condition (3), if an attempt is made to miniaturize the overall length of the zoom lens system, the refractive power of the positive third lens element and that of the positive fifth lens element have to be made stronger more than necessity in order to secure the positive refractive power of the positive second lens group 20. Consequently, spherical aberration occurred in both third and fifth positive lens elements becomes larger, and the correcting thereof becomes difficult.

Condition (4) concerns the focal length of the positive fifth lens element of the second lens group 20.

If the refractive power of the positive fifth lens element becomes stronger to the extent that $f_W/f_5$ exceeds the upper limit of condition (4), the positive refractive power of the positive second lens group 20 can be made stronger; however, spherical aberration occurred only in the positive fifth lens element becomes larger, so that the correcting thereof becomes difficult.

If the refractive power of the positive fifth lens element becomes weaker to the extent that $f_W/f_5$ exceeds the lower limit of condition (4), the positive refractive power of the positive second lens group 20 cannot be made stronger. When $f_W/f_5$ exceeds the lower limit of condition (4), if an attempt is made to miniaturize the overall length of the zoom lens system, most of the positive refractive power of the positive second lens group 20 has to be loaded on the positive third lens element thereof. Consequently, spherical aberration occurred in the positive third lens element becomes larger, so that the correcting thereof becomes difficult.

Condition (5) concerns the focal length of the negative first lens group 10.

If the negative refractive power of the negative first lens group 10 becomes weaker to the extent that $|f_{1G}|/f_W$ exceeds the upper limit of condition (5), the positive second lens group 20 has to be extremely loaded with a refractive power in order to reduce the overall length of the zoom lens system. Consequently, aberrations, in particular spherical aberration, largely occurs in the positive second lens group 20, so that the correcting thereof by the negative first lens group 10 and the positive third lens group 30 becomes difficult.

If the negative refractive power of the negative first lens group 10 becomes stronger to the extent that $|f_{1G}|/f_W$ exceeds the lower limit of condition (5), the traveling distance of the negative first lens group 10 becomes shorter, which is advantageous for miniaturization of the zoom lens system. However, negative distortion largely occurs, and the correcting thereof becomes difficult due to smaller number of the lens elements constituting the negative first lens group 10.

Condition (6) concerns the distribution of refractive power over the positive second lens group 20 and the positive third lens group 30 (the sixth lens element).

If $f_{2G}/f_6$ exceeds the upper limit of condition (6), the distribution of refractive power to the positive second lens group 20 becomes smaller (i.e., the refractive power of the positive second lens group 20 becomes relatively weaker), the negative first lens group 10 has to be extremely loaded with a refractive power in order to reduce the overall length of the zoom lens system. Consequently, aberrations, in particular coma at the short focal length extremity, largely occurs in the negative first lens group 10, so that the correcting thereof by the positive second lens group 20 and the positive third lens group 30 becomes difficult.

If $f_{2G}/f_6$ exceeds the lower limit of condition (6), the distribution of refractive power to the positive third lens group 30 becomes smaller (i.e., the refractive power of the positive third lens group 30 becomes relatively weaker), the exit pupil approached the image plane, so that telecentricity deteriorates. Moreover, the refractive power of the positive second lens group 20 becomes relatively stronger, and spherical aberration largely occurs in the positive second lens group 20.

Condition (7) concerns the thicknesses of the positive second lens group 20.

If $\Sigma 2G/f_W$ exceeds the upper limit of condition (7), the thickness of the positive second lens group 20 (i.e., the distance from the most object-side to the most image-side thereof) increases. Accordingly, the refractive power of the positive second lens group 20 needs to be made extremely stronger, so that aberrations, in particular spherical aberration, largely occurs. Consequently, the correcting of aberrations by the negative fist lens group 10 and the positive third lens group 30 becomes difficult.

If $\Sigma 2G/f_W$ exceeds the lower limit of condition (7), the positive refractive power of the positive second lens group 20 becomes weaker, since the number of the lens elements in the positive second lens group 20 is smaller. Consequently, the correcting of aberrations, in particular spherical aberration and coma, becomes difficult.

Condition (8) concerns the radius of curvature of the bonding surface between the negative fourth lens element and the positive fifth lens element of the positive second lens group 20.

If $(Nn-Np)/r_{C2}$ exceeds the upper limit of condition (8), the refractive power at the bonding surface becomes stronger, so that the correcting of spherical aberration becomes difficult.

Condition (9) concerns the difference in the Abbe number of the d-line with respect to the two positive lens elements and the one negative lens element of the positive second lens group 20. In the case where the number of the lens elements of the positive second lens group 20 is smaller, it is preferable to select glass materials so that the difference in the Abbe numbers of the materials is larger for the purpose of correcting chromatic aberration.

If νp−νn exceeds the lower limit of condition (9), the correcting of chromatic aberration, in particular axial chromatic aberration, cannot be made adequately.

Condition (10) concerns an angle formed by the optical axis and a principal ray with respect to the maximum image height at the short focal length extremity. This condition concerns telecentricity of the zoom lens system.

If βW exceeds the upper limit of condition (10), the principal ray to be incident on the image plane at a right angle largely deviates from being normal to the image plane. Such a largely deviated principal ray is a cause of shading.

If βW exceeds the lower limit of condition (10), the back focal distance at the short focal length extremity becomes longer, so that the overall length and diameter of the zoom lens system become larger.

Condition (11) concerns the difference in the angle formed by the optical axis and a principal ray with respect to the maximum image height at the short focal length extremity and the long focal length extremity, respectively. This condition concerns shading occurred in the zoom lens system.

If the difference in the angles becomes larger to the extent that βW−βT the upper limit of condition (11), shading occurs.

Condition (12) concerns the radius of curvature of the bonding surface between the positive third lens element and the negative fourth lens element of the positive second lens group 20. Namely, this condition (12) concerns the radius of curvature of the bonding surface of the two lens elements, on the side of the object, among the three lens elements constituting the positive second lens group 20. Since the above-mentioned boding surface has a larger radius of curvature, it is possible to form either a convex bonding surface or a concave bonding surface in order to correct aberrations.

By satisfying condition (12), the image-side surface of the positive third lens element becomes a concave surface. This image-side concave surface of the positive third lens element can be advantageously utilized in the bonding process of the three lens elements as follows:

(i) horizontally setting the positive third lens element facing the object-side surface thereof downward so that the negative fourth lens element is bonded onto the positive third lens element in the vertically upward direction perpendicular to the horizontal direction; and (ii) setting the object-side surface of the positive third lens element as a reference surface for bonding so that the image-side concave surface thereof can hold a bonding agent and does not allow the same to flow from the image-side concave surface when the negative fourth lens element is being bonded onto the image-side concave surface of the positive third lens element.

Furthermore, since the image-side surface of the negative fourth lens element is originally made as a deep concave surface (i.e., the uppermost surface of the positive third lens element and the negative fourth lens element when these elements are in the bonding process), a bonding agent does not flow from the image-side deep concave surface of the negative fourth lens element when the positive fifth lens element is being bonded onto the image-side deep concave surface of the negative fourth lens element.

In the above-explained bonding process, the three lens elements can be bonded to each other, while the object-side surface of the positive third lens element is fixed as the reference surface for bonding. Consequently, decentration can be reduced at the manufacturing stage.

If $r_{C1}$ exceeds the lower limit of condition (12), the image-side surface of the positive third lens element becomes a convex surface, so that a bonding agent cannot be held thereon.

Accordingly, when $r_{C1}$ exceeds the lower limit of condition (12), the bonding process for the three lens elements has to be performed as follows:

(i') horizontally setting the negative fourth lens element facing the image-side surface thereof downward so that the positive third lens element is bonded onto the negative fourth lens element in the vertically upward direction perpendicular to the horizontal direction;

(ii') setting the image-side surface of the negative fourth lens element as a reference surface for bonding so that the object-side concave surface thereof can hold a bonding agent and does not allow the same to flow from the object-side concave surface when the positive third lens element is being bonded onto the object-side concave surface of the negative fourth lens element; and (iii') changing the reference surface for bonding from the image-side surface of the negative fourth lens element to the object-side surface of the positive third lens element so that the image-side deep concave surface of the negative fourth lens element is exposed in the vertically upward direction; and (iv') bonding the positive fifth lens element onto the image-side concave surface of the negative fourth lens element by holding the bonding agent in the image-side concave surface of the negative fourth lens element.

As can bee seen, since the reference surface are changed upon bonding, such a bonding process causes decentration.

Condition (13) concerns the zoom ratio of the entire zoom lens system. By satisfying this condition, a sufficient zoom ratio can be attained.

Specific numerical data of the embodiments will be described hereinafter.

In the diagrams of chromatic aberration (axial chromatic aberration) represented by spherical aberration the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

The tables, FNO. designates the f-number, f designates the focal length of the entire zoom lens system, W designates the half angle-of-view (°), fB designates the back focal distance (the equivalent air thickness, along the optical axis, from the most image-side surface of the positive third lens group 30 to the image plane of the imaging device), r designates the radius of curvature, d designates a lens-element thickness or distance between lens elements, $N_d$ designates the refractive index of the d-line, and ν designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:

c designates a curvature of the aspherical vertex (1/r);

y designates a distance from the optical axis;

k designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Figure 1:
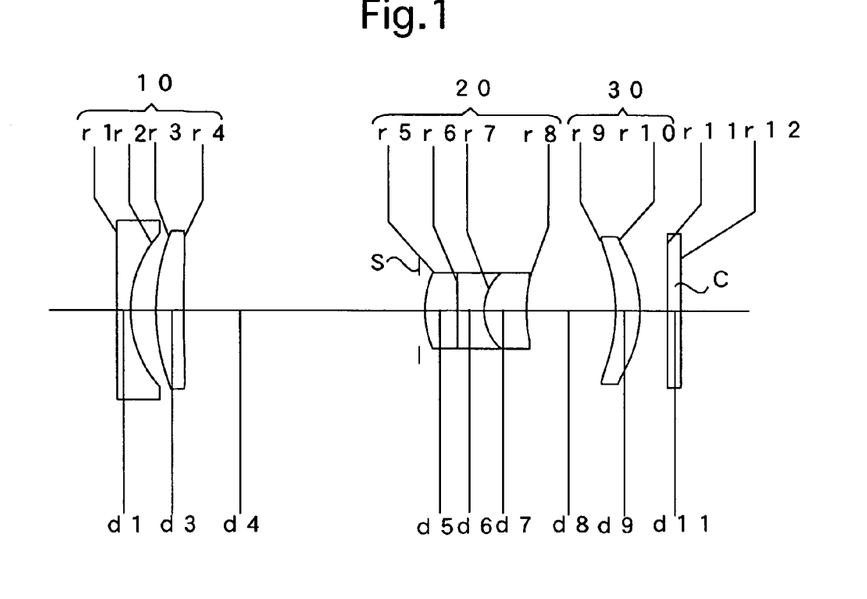
FIG. 1 is a lens arrangement of the zoom lens system according to a first embodiment of the present invention.
Figures 2A, 2B, 2C:
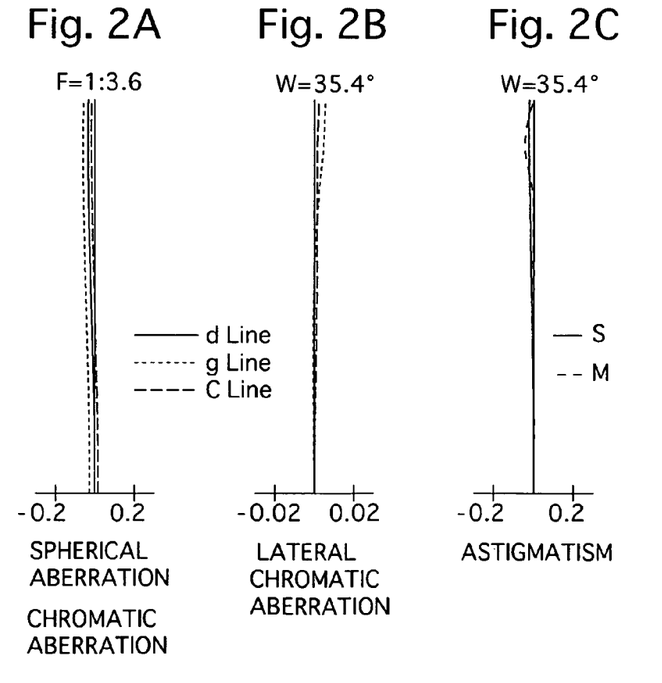
FIGS. 2A, 2B, 2C and 2D show aberrations occurred in the lens arrangement shown in FIG. 1, at the short focal length extremity.
Figure 2D:
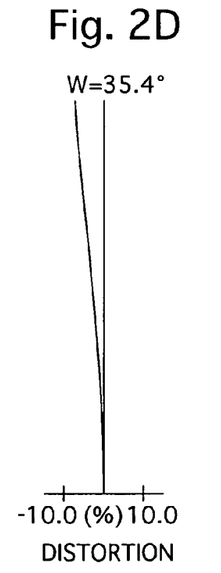
Figures 3A, 3B:
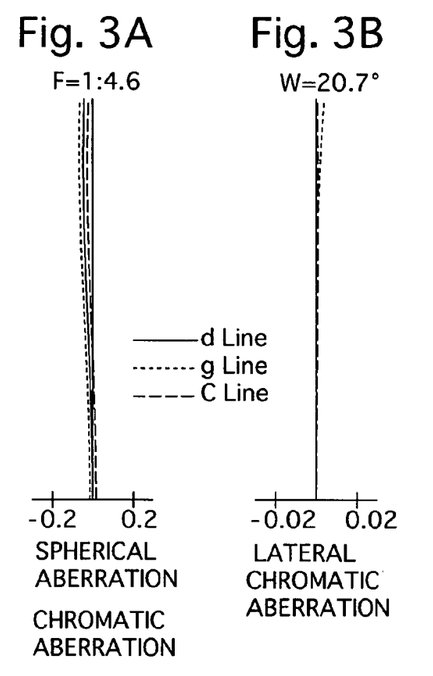
FIGS. 3A, 3B, 3C and 3D show aberrations occurred in the lens arrangement shown in FIG. 1, at an intermediate focal length position.
Figure 3C:
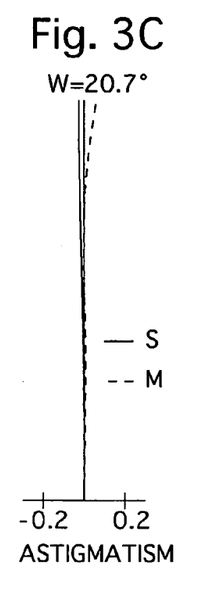
Figure 3D:
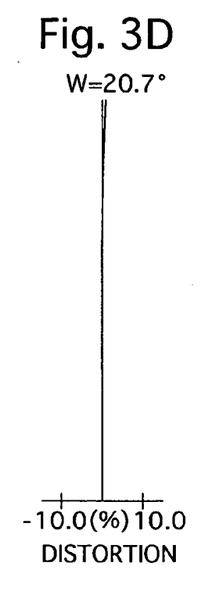
Figures 4A, 4B:
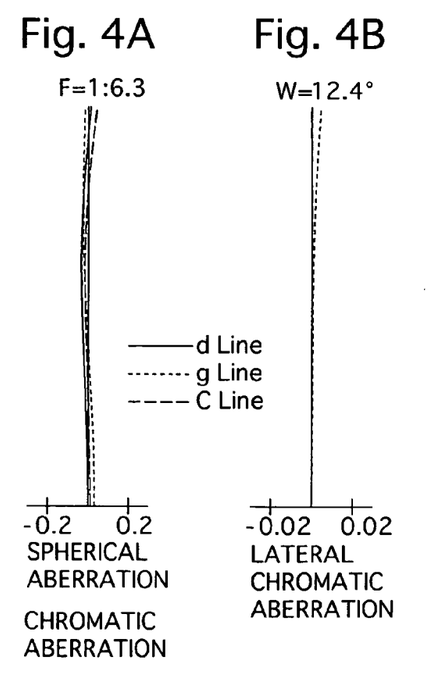
FIGS. 4A, 4B, 4C and 4D show aberrations occurred in the lens arrangement shown in FIG. 1, at the long focal length extremity.
Figure 4C:
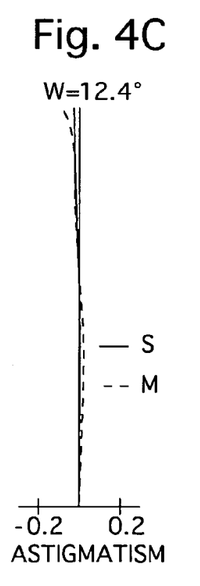
Figure 4D:
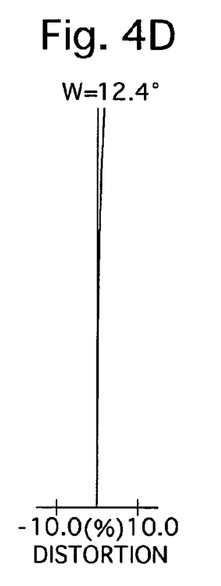

[Embodiment 1]

FIG. 1 is the lens arrangement of the zoom lens system according to the first embodiment of the present invention. FIGS. 2A through 2D show aberrations occurred in the lens arrangement shown in FIG. 1, at the short focal length extremity. FIGS. 3A through 3D show aberrations occurred in the lens arrangement shown in FIG. 1, at an intermediate focal length position. FIGS. 4A through 4D show aberrations occurred in the lens arrangement shown in FIG. 1, at the long focal length extremity. Table 1 shows the numerical data of the first embodiment.

The negative first lens group 10 includes a negative first lens element and a positive second lens element, in this order from the object. The object-side surface and the image-side surface of the positive second lens element are formed as aspherical surfaces, each of which is symmetrical with respect to the optical axis.

The positive second lens group 20 includes a positive third lens element, a negative fourth lens element and a positive fifth lens element, all of which are bonded to each other, in this order from the object. The object-side surface of the positive third lens element and the image-side surface of the positive fifth lens element are formed as aspherical surfaces, each of which is symmetrical with respect to the optical axis.

The positive third lens group 30 includes a positive meniscus lens element (the positive sixth lens element) having the convex surface facing toward the image. The object-side surface and the image-side surface of the positive meniscus lens element are formed as aspherical surfaces, each of which is symmetrical with respect to the optical axis.

A cover-glass plate placed in front of the imaging device is provided behind (on the image side) the positive third lens group 30.

A diaphragm S is provided 0.20 in front of the positive second lens group 20 (surface No. 5).

TABLE 1

F = 1:3.6–4.6–6.3
f = 4.40–7.60–13.00
W = 35.4–20.7–12.4
$f_B$ = 2.50–2.50–2.50

| Surf. No. | r | d | Nd | ν |
|---|---|---|---|---|
| 1 | 371.737 | 0.50 | 1.88300 | 40.8 |
| 2 | 4.285 | 0.93 | — | — |
| 3* | 7.896 | 1.00 | 1.84666 | 23.8 |
| 4* | 36.355 | 8.80–3.54–0.54 | — | — |
| 5* | 3.577 | 1.17 | 1.87408 | 41.3 |
| 6 | 250.000 | 1.00 | 1.69287 | 29.8 |
| 7 | 1.899 | 1.55 | 1.58636 | 60.9 |
| 8* | 6.428 | 3.25–5.57–9.48 | — | — |
| 9* | −6.904 | 0.90 | 1.65128 | 38.3 |
| 10* | −4.562 | 1.00 | — | — |
| 11 | ∞ | 0.50 | 1.51633 | 64.1 |
| 12 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | −0.37957 × 10$^{-3}$ | 0.72870 × 10$^{-4}$ | −0.59022 × 10$^{-5}$ |
| 4 | 0.00 | −0.11275 × 10$^{-2}$ | 0.55760 × 10$^{-4}$ | −0.88593 × 10$^{-5}$ |
| 5 | 0.00 | −0.25165 × 10$^{-3}$ | −0.68257 × 10$^{-4}$ | |
| 8 | 0.00 | 0.10802 × 10$^{-1}$ | 0.15863 × 10$^{-2}$ | 0.20000 × 10$^{-4}$ |
| 9 | 0.00 | −0.53057 × 10$^{-2}$ | 0.73506 × 10$^{-3}$ | 0.44593 × 10$^{-5}$ |
| 10 | 0.00 | −0.28029 × 10$^{-2}$ | 0.38430 × 10$^{-3}$ | 0.25000 × 10$^{-4}$ |

Figure 5:
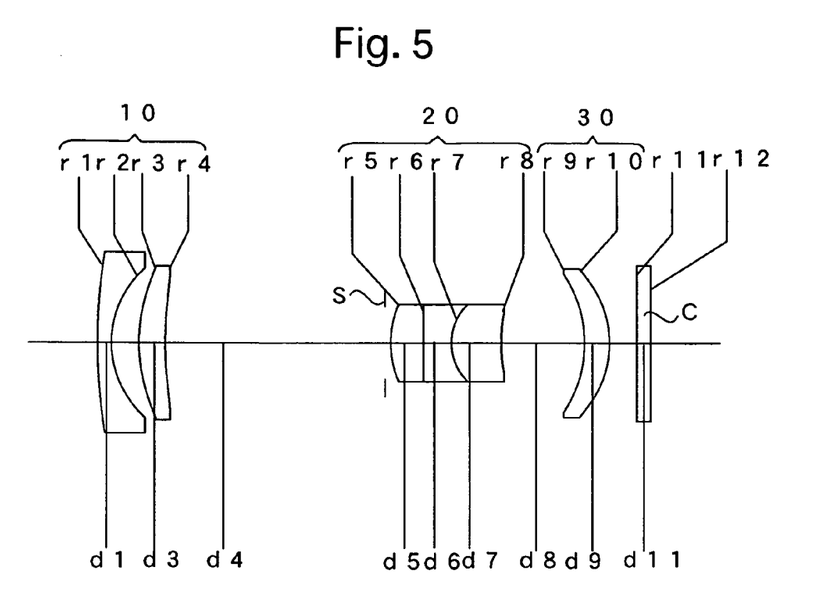
FIG. 5 is a lens arrangement of the zoom lens system according to a second embodiment of the present invention.
Figure 6A:
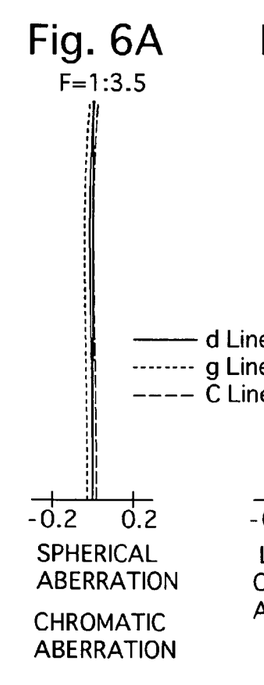
FIGS. 6A, 6B, 6C and 6D show aberrations occurred in the lens arrangement shown in FIG. 5, at the short focal length extremity.
Figure 6B:
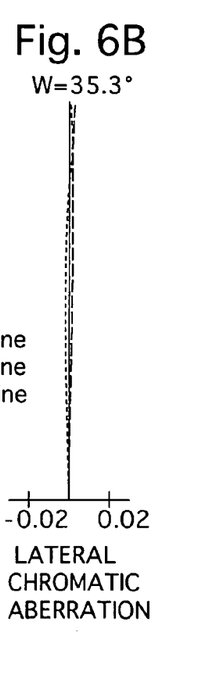
Figure 6C:
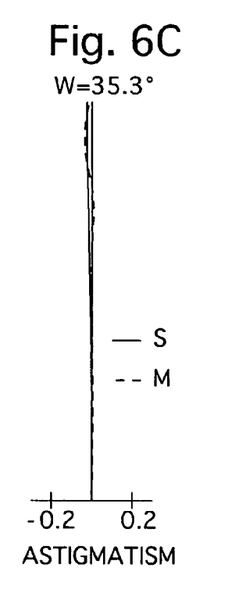
Figure 6D:
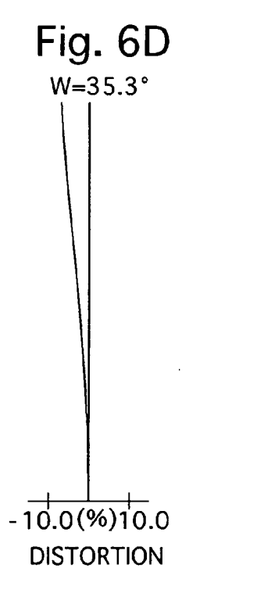
Figure 7A:
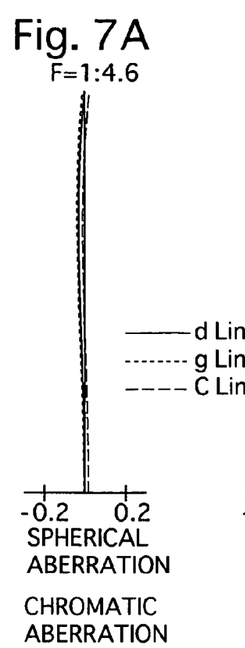
FIGS. 7A, 7B, 7C and 7D show aberrations occurred in the lens arrangement shown in FIG. 5, at an intermediate focal length position.
Figure 7B:
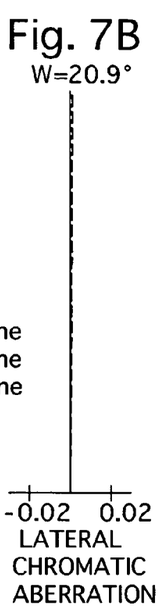
Figure 7C:
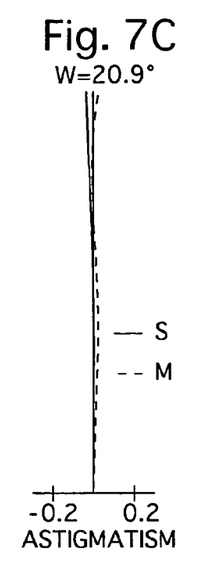
Figure 7D:
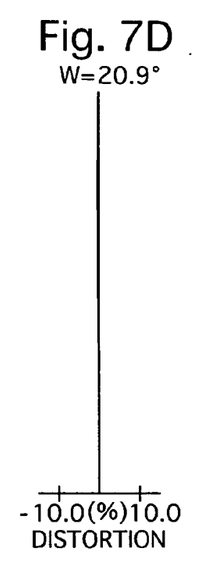
Figure 8A:
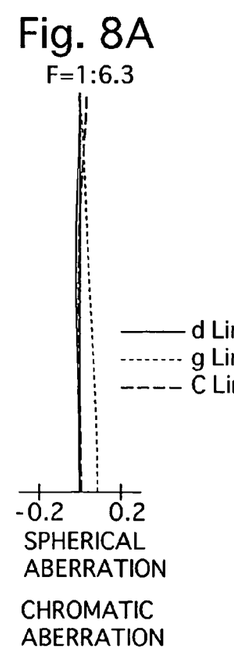
FIGS. 8A, 8B, 8C and 8D show aberrations occurred in the lens arrangement shown in FIG. 5, at the long focal length extremity.
Figure 8B:
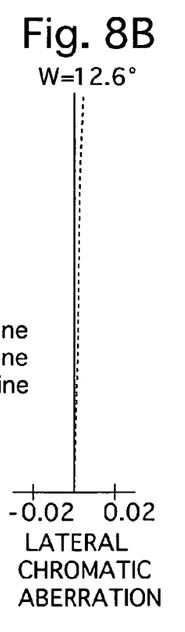
Figure 8C:
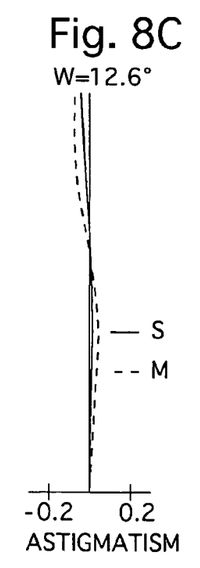
Figure 8D:
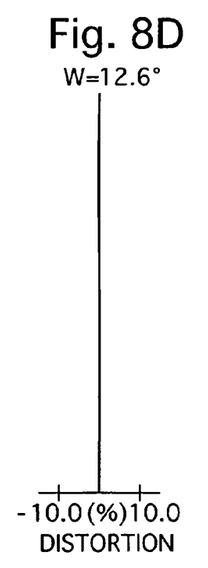

[Embodiment 2]

FIG. 5 is the lens arrangement of the zoom lens system according to the second embodiment of the present invention. FIGS. 6A through 6D show aberrations occurred in the lens arrangement shown in FIG. 5, at the short focal length extremity. FIGS. 7A through 7D show aberrations occurred in the lens arrangement shown in FIG. 5, at an intermediate focal length position. FIGS. 8A through 8D show aberrations occurred in the lens arrangement shown in FIG. 5, at the long focal length extremity. Table 2 shows the numerical data of the second embodiment.

The basic lens arrangement of the second embodiment is the same as that of the first embodiment, except that the image-side surface of the negative first lens element of the negative first lens group 10 is formed as an aspherical surface.

A diaphragm S is provided 0.20 in front of the second lens group 20 (surface No. 5).

TABLE 2

F = 1:3.5–4.6–6.3
f = 4.40–7.60–13.00
W = 35.3–20.9–12.6
$f_B$ = 2.60–2.60–2.60

| Surf. No. | r | d | Nd | ν |
|---|---|---|---|---|
| 1 | 20.838 | 0.50 | 1.88300 | 40.8 |
| 2* | 3.633 | 1.01 | — | — |
| 3* | 5.937 | 0.96 | 1.84666 | 23.8 |
| 4* | 11.973 | 8.15–3.38–0.66 | — | — |
| 5* | 3.548 | 1.16 | 1.83481 | 42.7 |
| 6 | 125.000 | 1.00 | 1.68740 | 29.6 |
| 7 | 1.999 | 1.80 | 1.59884 | 54.6 |
| 8* | 7.987 | 2.99–5.31–9.22 | — | — |
| 9* | −5.409 | 0.90 | 1.63854 | 55.4 |
| 10* | −4.100 | 1.00 | — | — |
| 11 | ∞ | 0.50 | 1.51633 | 64.1 |
| 12 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 2 | 0.00 | −0.63085 × 10$^{-4}$ | −0.85225 × 10$^{-5}$ | |
| 3 | 0.00 | −0.77823 × 10$^{-3}$ | 0.62326 × 10$^{-4}$ | −0.12357 × 10$^{-4}$ |
| 4 | 0.00 | −0.16913 × 10$^{-2}$ | 0.21552 × 10$^{-4}$ | −0.16513 × 10$^{-4}$ |
| 5 | 0.00 | −0.38972 × 10$^{-3}$ | −0.89671 × 10$^{-4}$ | |
| 8 | 0.00 | 0.10781 × 10$^{-1}$ | 0.16503 × 10$^{-2}$ | 0.20000 × 10$^{-4}$ |
| 9 | 0.00 | −0.75191 × 10$^{-2}$ | 0.66822 × 10$^{-3}$ | 0.44593 × 10$^{-5}$ |
| 10 | 0.00 | −0.42498 × 10$^{-2}$ | 0.24916 × 10$^{-3}$ | 0.25000 × 10$^{-4}$ |

Figure 9:
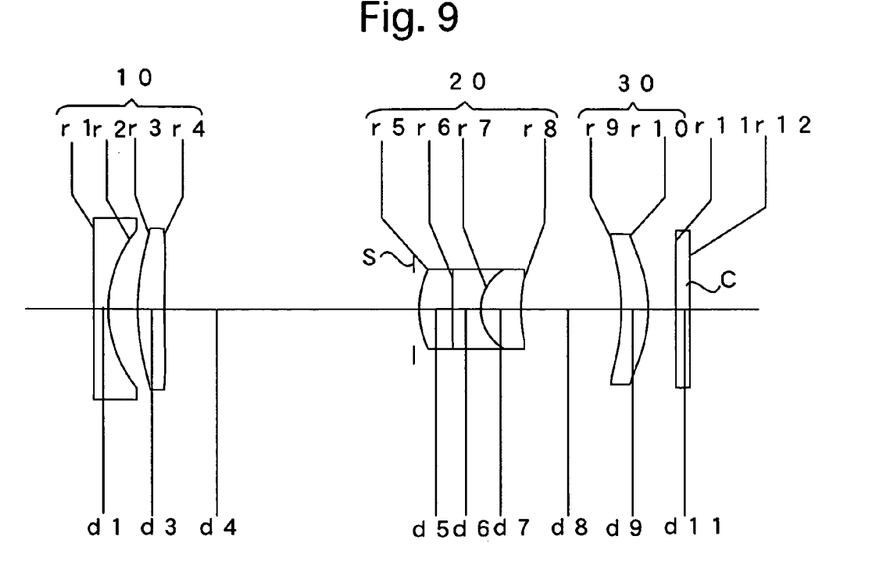
FIG. 9 is a lens arrangement of the zoom lens system according to a third embodiment of the present invention.
Figures 10A, 10B:
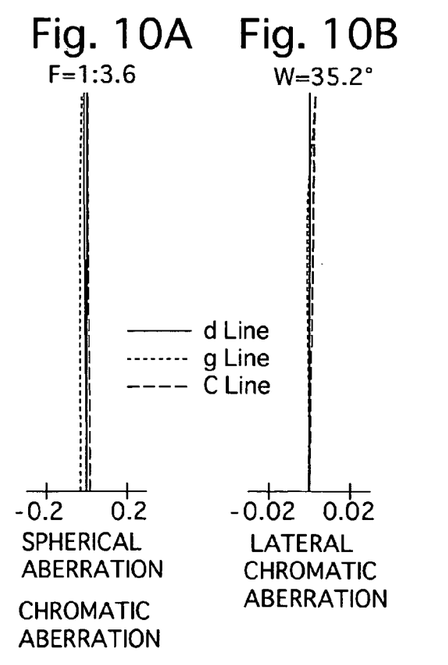
FIGS. 10A, 10B, 10C and 10D show aberrations occurred in the lens arrangement shown in FIG. 9, at the short focal length extremity.
Figure 10C:
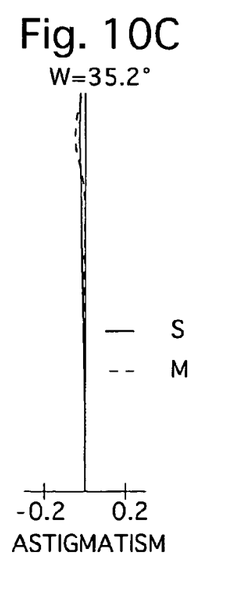
Figure 10D:
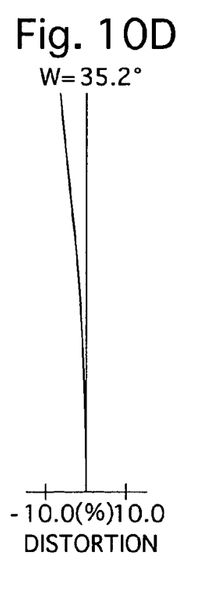
Figures 11A, 11B:
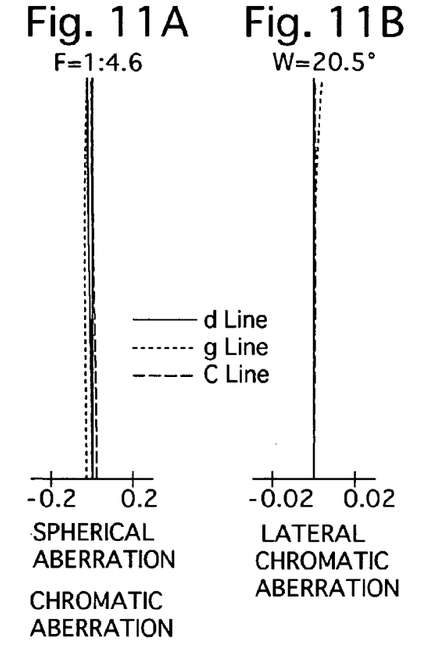
FIGS. 11A, 11B, 11C and 11D show aberrations occurred in the lens arrangement shown in FIG. 9, at an intermediate focal length position.
Figure 11C:
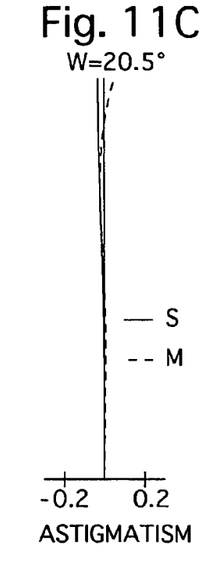
Figure 11D:
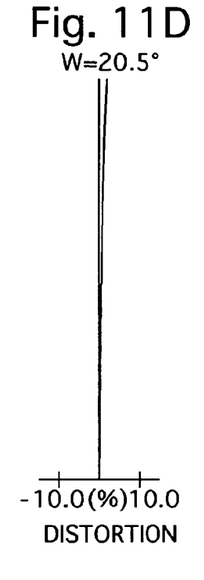
Figures 12A, 12B:
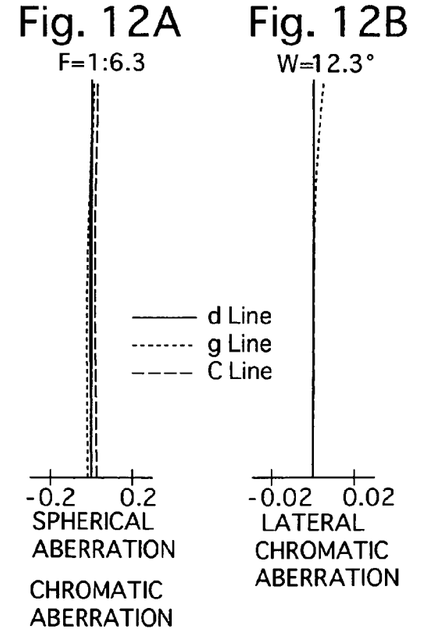
FIGS. 12A, 12B, 12C and 12D show aberrations occurred in the lens arrangement shown in FIG. 9, at the long focal length extremity.
Figure 12C:
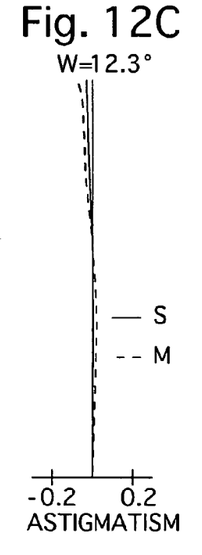
Figure 12D:
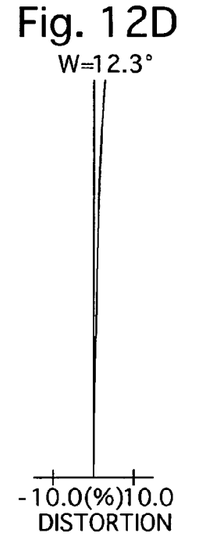

[Embodiment 3]

FIG. 9 is the lens arrangement of the zoom lens system according to the third embodiment of the present invention. FIGS. 10A through 10D show aberrations occurred in the lens arrangement shown in FIG. 9, at the short focal length extremity. FIGS. 11A through 11D show aberrations occurred in the lens arrangement shown in FIG. 9, at an intermediate focal length position. FIGS. 12A through 12D show aberrations occurred in the lens arrangement shown in FIG. 9, at the long focal length extremity. Table 3 shows the numerical data of the third embodiment.

The basic lens arrangement of the third embodiment is the same as that of the second embodiment.

A diaphragm S is provided 0.20 in front of the second lens group 20 (surface No. 5).

TABLE 3

F = 1:3.6–4.6–6.3
f = 4.40–7.60–13.00
W = 35.2–20.5–12.3
$f_B$ = 2.20–2.20–2.20

| Surf. No. | r | d | Nd | ν |
|---|---|---|---|---|
| 1 | −306.390 | 0.50 | 1.88300 | 40.8 |
| 2* | 4.300 | 1.06 | — | — |
| 3* | 7.633 | 0.97 | 1.84666 | 23.8 |
| 4* | 35.433 | 9.16–3.66–0.53 | — | — |
| 5* | 3.455 | 1.19 | 1.88300 | 40.8 |
| 6 | 90.000 | 1.01 | 1.71677 | 28.1 |
| 7 | 1.688 | 1.44 | 1.58309 | 47.2 |
| 8* | 6.659 | 3.62–5.94–9.85 | — | — |
| 9* | −8.868 | 0.97 | 1.67859 | 30.5 |
| 10* | −5.275 | 1.00 | — | — |
| 11 | ∞ | 0.50 | 1.51633 | 64.1 |
| 12 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 2 | 0.00 | $-0.14624 \times 10^{-2}$ | $0.38977 \times 10^{-4}$ | |
| 3 | 0.00 | $-0.19699 \times 10^{-2}$ | $0.55384 \times 10^{-4}$ | $-0.38703 \times 10^{-5}$ |
| 4 | 0.00 | $-0.17729 \times 10^{-2}$ | $0.22016 \times 10^{-4}$ | $-0.62418 \times 10^{-5}$ |
| 5 | 0.00 | $-0.35502 \times 10^{-3}$ | $-0.63574 \times 10^{-4}$ | |
| 8 | 0.00 | $-0.10216 \times 10^{-1}$ | $0.84465 \times 10^{-3}$ | $0.20000 \times 10^{-4}$ |
| 9 | 0.00 | $-0.32206 \times 10^{-2}$ | $0.52473 \times 10^{-3}$ | $0.44593 \times 10^{-5}$ |
| 10 | 0.00 | $-0.77385 \times 10^{-3}$ | $0.19518 \times 10^{-3}$ | $0.25000 \times 10^{-4}$ |

The numerical values of each condition for each embodiment are shown in Table 4.

TABLE 4

| | Embodiment 1 | Embodiment 2 | Embodiment 3 |
|---|---|---|---|
| Condition (1) | 1.43 | 1.37 | 1.47 |
| Condition (2) | 1.06 | 1.01 | 1.09 |
| Condition (3) | −1.59 | −1.48 | −1.82 |
| Condition (4) | 1.08 | 1.10 | 1.26 |
| Condition (5) | 2.17 | 2.00 | 2.21 |
| Condition (6) | 0.35 | 0.29 | 0.37 |
| Condition (7) | 0.85 | 0.90 | 0.83 |
| Condition (8) | 0.06 | 0.04 | 0.08 |
| Condition (9) | 21.3 | 19.1 | 15.9 |
| Condition (10) | 15.2 | 15.6 | 14.8 |

TABLE 4-continued

| | Embodiment 1 | Embodiment 2 | Embodiment 3 |
|---|---|---|---|
| Condition (11) | 8.25 | 8.78 | 7.67 |
| Condition (12) | 250.0 | 120.0 | 90.0 |
| Condition (13) | 2.95 | 2.95 | 2.95 |

As can be understood from Table 4, each of the first through third embodiments satisfies conditions (1) through (13). Furthermore, as can be understood from the aberration diagrams, the various aberrations are adequately corrected.

According to the above description, an ultra-compact zoom lens system having the following features can be obtained:

a fewer number of lens elements;

a zoom ratio of 2 to 3;

achieving higher optical performance suitable for higher pixelation of an imaging device.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group, a diaphragm, a positive second lens group, and a positive third lens group, in this order from an object:

wherein zooming is performed by moving said negative first lens group and said positive second lens group in the optical axis direction;

wherein said zoom lens system comprises six lens elements;

wherein a negative first lens element and a positive second lens element, in this order from the object, are arranged to constitute said negative first lens group;

wherein a positive third lens element, a negative fourth lens element and a positive fifth lens element, all of which are bonded to each other, in this order from the object, are arranged to constitute said positive second lens group;

wherein a positive sixth lens element is arranged to constitute said positive third lens group;

wherein upon zooming from the short focal length extremity to the long focal length extremity, a distance between said negative first lens group and said positive second lens group decreases; and wherein a distance between said positive second lens group and said positive third lens group increases, while said positive third lens group remains stationary with respect to the image plane.

2. A zoom lens system comprises a negative first lens group, a diaphragm, a positive second lens group, and a positive third lens group, in this order from an object:

wherein zooming is performed by moving said negative first lens group and said positive second lens group in the optical axis direction;

wherein said zoom lens system comprises six lens elements;

wherein a negative first lens element and a positive second lens element, in this order from the object, are arranged to constitute said negative first lens group;

wherein a positive third lens element, a negative fourth lens element and a positive fifth lens element, all of which are bonded to each other, in this order from the object, are arranged to constitute said positive second lens group;

wherein a positive sixth lens element is arranged to constitute said positive third lens group; and wherein the zoom lens system satisfies the following relationship:

$$1.2 < f_{2G}/f_W < 1.6$$

wherein $f_{2G}$ designates the focal length of said positive second lens group; and $f_W$ designates the focal length of said entire zoom lens system at the short focal length extremity.

3. A zoom lens system comprises a negative first lens group, a diaphragm, a positive second lens group, and a positive third lens group, in this order from an object:

wherein zooming is performed by moving said negative first lens group and said positive second lens group in the optical axis direction;

wherein said zoom lens system comprises six lens elements;

wherein a negative first lens element and a positive second lens element, in this order from the object, are arranged to constitute said negative first lens group;

wherein a positive third lens element, a negative fourth lens element and a positive fifth lens element, all of which are bonded to each other, in this order from the object, are arranged to constitute said positive second lens group;

wherein a positive sixth lens element is arranged to constitute said positive third lens group; and wherein the zoom lens system satisfies the following relationship:

$$0.8 < f_W/f_3 < 1.2$$

wherein $f_W$ designates the focal length of said entire zoom lens system at the short focal length extremity; and $f_3$ designates the focal length of said positive third lens element of said positive second lens group.

4. A zoom lens system comprises a negative first lens group, a diaphragm, a positive second lens group, and a positive third lens group, in this order from an object:

wherein zooming is performed by moving said negative first lens group and said positive second lens group in the optical axis direction;

wherein said zoom lens system comprises six lens elements;

wherein a negative first lens element and a positive second lens element, in this order from the object, are arranged to constitute said negative first lens group;

wherein a positive third lens element, a negative fourth lens element and a positive fifth lens element, all of which are bonded to each other, in this order from the object, are arranged to constitute said positive second lens group;

wherein a positive sixth lens element is arranged to constitute said positive third lens group; and wherein the zoom lens system satisfies the following relationship:

$$-2.0 < f_W/f_4 < -1.4$$

wherein $f_W$ designates the focal length of said entire zoom lens system at the short focal length extremity; and $f_4$ designates the focal length of said negative fourth lens element of said positive second lens group.

5. A zoom lens system comprises a negative first lens group, a diaphragm, a positive second lens group, and a positive third lens group, in this order from an object;

wherein zooming is performed by moving said negative first lens group and said positive second lens group in the optical axis direction;

wherein said zoom lens system comprises six lens elements;

wherein a negative first lens element and a positive second lens element, in this order from the object, are arranged to constitute said negative first lens group;

wherein a positive third lens element, a negative fourth lens element and a positive fifth lens element, all of which are bonded to each other, in this order from the object, are arranged to constitute said positive second lens group;

wherein a positive sixth lens element is arranged to constitute said positive third lens group; and wherein the zoom lens system satisfies the following relationship:

$$0.8 < f_W/f_5 < 1.4$$

wherein $f_W$ designates the focal length of said entire zoom lens system at the short focal length extremity; and $f_5$ designates the focal length of said positive fifth lens element of said positive second lens group.

6. A zoom lens system comprises a negative first lens group, a diaphragm, a positive second lens group, and a positive third lens group, in this order from an object;

wherein zooming is performed by moving said negative first lens group and said positive second lens group in the optical axis direction;

wherein said zoom lens system comprises six lens elements;

wherein a negative first lens element and a positive second lens element, in this order from the object, are arranged to constitute said negative first lens group;

wherein a positive third lens element, a negative fourth lens element and a positive fifth lens element, all of which are bonded to each other, in this order from the object, are arranged to constitute said positive second lens group;

wherein a positive sixth lens element is arranged to constitute said positive third lens group; and wherein the zoom lens system satisfies the following relationship:

$$1.5 < |f_{1G}|/f_W < 2.5$$

wherein $f_{1G}$ designates the focal length of said negative first lens group; and $f_W$ designates the focal length of said entire zoom lens system at the short focal length extremity.

7. A zoom lens system comprises a negative first lens group, a diaphragm, a positive second lens group, and a positive third lens group, in this order from an object;

wherein zooming is performed by moving said negative first lens group and said positive second lens group in the optical axis direction;

wherein said zoom lens system comprises six lens elements; wherein a negative first lens element and a positive second lens element, in this order from the object, are arranged to constitute said negative first lens group;

wherein a positive third lens element, a negative fourth lens element and a positive fifth lens element, all of which are bonded to each other, in this order from the object, are arranged to constitute said positive second lens group;

wherein a positive sixth lens element is arranged to constitute said positive third lens group; and wherein the zoom lens system satisfies the following relationship:

$$0.2 < g_{2G}/f_6 < 0.5$$

wherein $f_{2G}$ designates the focal length of said positive second lens group; and $f_6$ designates the focal length of said sixth lens element.

8. A zoom lens system comprises a negative first lens group, a diaphragm, a positive second lens group, and a positive third lens group, in this order from an object;

wherein zooming is performed by moving said negative first lens group and said positive second Lens group in the optical axis direction;

wherein said zoom lens system comprises six lens elements;

wherein a negative first lens element and a positive second lens element, in this order from the object, are arranged to constitute said negative first lens group;

wherein a positive third lens element, a negative fourth lens element and a positive fifth lens element, all of which are bonded to each other, in this order from the object, are arranged to constitute said positive second lens group;

wherein a positive sixth lens element is arranged to constitute said positive third lens group; and wherein the zoom lens system satisfies the following relationship:

$$0.5 < \Sigma 2G/f_W < 1.0$$

wherein $\Sigma 2G$ designates the distance from the most object-side surface of said positive second lens group to the most image-side surface thereof; and $f_W$ designates the focal length of said entire zoom lens system at the short focal length extremity.

9. A zoom lens system comprises a negative first lens group, a diaphragm, a positive second lens group, and a positive third lens group, in this order from an object:

wherein zooming is performed by moving said negative first lens group and said positive second lens group in the optical axis direction;

wherein said zoom lens system comprises six lens elements;

wherein a negative first lens element and a positive second lens element, in this order from the object, are arranged to constitute said negative first lens group:

wherein a positive third lens element, a negative fourth lens element and a positive fifth lens element, all of which are bonded to each other, in this order from the object, are arranged to constitute said positive second lens group;

wherein a positive sixth lens element is arranged to constitute said positive third lens group;

wherein the zoom lens system satisfies the following relationship:

$$(Nn-Np)/f_{C2} < 0.1$$

wherein $Nn$ designates the refractive index of the d-line with respect to said negative fourth lens element of said positive second lens group;

$Np$ designates the refractive index of the d-line with respect to said positive fifth lens element of said positive second lens group; and $r_{C2}$ designates the radius of curvature of the bonding surface between said negative fourth lens element and said positive fifth lens element of said positive second lens group.

10. A zoom lens system comprises a negative first lens group, a diaphragm, a positive second lens group, and a positive third lens group, in this order from an object:

wherein zooming is performed by moving said negative first lens group and said positive second lens group in the optical axis direction;

wherein said zoom lens system comprises six lens elements;

wherein a negative first lens element and a positive second lens element, in this order from the object, are arranged to constitute said negative first lens group;

wherein a positive third lens element, a negative fourth lens element and a positive fifth lens element, all of which are bonded to each other, in this order from the object, are arranged to constitute said positive second lens group;

wherein a positive sixth lens element is arranged to constitute said positive third lens group; and wherein the zoom lens system satisfies the following relationship:

$$12 < \upsilon p - \upsilon n$$

wherein $\upsilon p$ designates the average Abbe number with respect to said positive third lens element and said positive fifth lens element of said positive second lens group; and $\upsilon n$ designates the Abbe number of said negative fourth lens element of said positive second lens group.

11. A zoom lens system comprises a negative first lens group, a diaphragm, a positive second lens group, and a positive third lens group, in this order from an object:

wherein zooming is performed by moving said negative first lens group and said positive second lens group in the optical axis direction;

wherein said zoom lens system comprises six lens elements;

wherein a negative first lens element and a positive second lens element, in this order from the object, are arranged to constitute said negative first lens group;

wherein a positive third lens element, a negative fourth lens element and a positive fifth lens element, all of which are bonded to each other, in this order from the object, are arranged to constitute said positive second lens group;

wherein a positive sixth lens element is arranged to constitute said positive third lens group; and wherein the zoom lens system satisfies the following relationship:

$$10° < \beta W < 25°$$

wherein

βW designates an angle formed by the optical axis and a principal ray with respect to the maximum image height at the short focal length extremity.

12. A zoom lens system comprises a negative first lens group, a diaphragm, a positive second lens group, and a positive third lens group, in this order from an object:
   wherein zooming is performed by moving said negative first lens group and said positive second lens group in the optical axis direction;
   wherein said zoom lens system comprises six lens elements;
   wherein a negative first lens element and a positive second lens element, in this order from the object, are arranged to constitute said negative first lens group;
   wherein a positive third lens element, a negative fourth lens element and a positive fifth lens element, all of which are bonded to each other, in this order from the object, are arranged to constitute said positive second lens group;
   wherein a positive sixth lens element is arranged to constitute said positive third lens group; and
   wherein the zoom lens system satisfies the following relationship:

$$\beta W - \beta T < 12°$$

wherein
   βW designates an angle formed by the optical axis and a principal ray with respect to the maximum image height at the short focal length extremity; and
   βT designates an angle formed by the optical axis and a principal ray with respect to the maximum image height at the long focal length extremity.

13. A zoom lens system comprises a negative first lens group, a diaphragm, a positive second lens group, and a positive third lens group, in this order from an object:
   wherein zooming is performed by moving said negative first lens group and said positive second lens group in the optical axis direction;
   wherein said zoom lens system comprises six lens elements;
   wherein a negative first lens element and a positive second lens element, in this order from the object, are arranged to constitute said negative first lens group;
   wherein a positive third lens element, a negative fourth lens element and a positive fifth lens element, all of which are bonded to each other, in this order from the object, are arranged to constitute said positive second lens group;
   wherein a positive sixth lens element is arranged to constitute said positive third lens group; and
   wherein the zoom lens system satisfies the following relationship:

$$0 < r_{C1}$$

wherein
   $r_{C1}$ designates the radius of curvature of the bonding surface between said positive third lens element and said negative fourth lens element of said positive second lens group.

14. A zoom lens system comprises a negative first lens group, a diaphragm, a positive second lens group, and a positive third lens group, in this order from an object:
   wherein zooming is performed by moving said negative first lens group and said positive second lens group in the optical axis direction;
   wherein said zoom lens system comprises six lens elements;
   wherein a negative first lens element and a positive second lens element, in this order from the object, are arranged to constitute said negative first lens group;
   wherein a positive third lens element, a negative fourth lens element and a positive fifth lens element, all of which are bonded to each other, in this order from the object, are arranged to constitute said positive second Lens group;
   wherein a positive sixth lens element is arranged to constitute said positive third lens group; and
   wherein the zoom lens system satisfies the following relationship:

$$2.8 < f_T/f_W$$

wherein
   $f_T$ designates the focal length of said entire zoom lens system at the long focal length extremity; and
   $f_w$ designates the focal length of said entire zoom lens system at the short focal length extremity.

15. A zoom lens system comprises a negative first lens group, a diaphragm, a positive second lens group, and a positive third lens group, in this order from an object;
   wherein zooming is performed by moving said negative first lens group and said positive second lens group in the optical axis direction;
   wherein said zoom lens system comprises six lens elements;
   wherein a negative first lens element and a positive second lens element, in this order from the object, are arranged to constitute said negative first lens group;
   wherein a positive third lens element, a negative fourth lens element and a positive fifth lens element, all of which are bonded to each other, in this order from the object, are arranged to constitute said positive second lens group;
   wherein a positive sixth lens element is arranged to constitute said positive third lens group; and
   wherein focusing is performed by one of the following moving patterns of said lens groups;
   moving only said negative first lens group;
   moving only said positive second lens group; or
   integrally moving said negative first lens group and said positive second lens group.

* * * * *